(12) United States Patent
Li et al.

(10) Patent No.: US 11,495,829 B1
(45) Date of Patent: Nov. 8, 2022

(54) GENERATION OF WRINKLE-FREE SILICON MONOXIDE ELECTRODES USING COMBINED PREFORMATION AND FORMATION

(71) Applicant: Wisk Aero LLC, Mountain View, CA (US)

(72) Inventors: Chen Li, Santa Clara, CA (US); Patrick K. Herring, Redwood City, CA (US)

(73) Assignee: Wisk Aero LLC, Mountain View, CA (US)

(*) Notice: Subject to any disclaimer, the term of this patent is extended or adjusted under 35 U.S.C. 154(b) by 100 days.

(21) Appl. No.: 16/588,307

(22) Filed: Sep. 30, 2019

Related U.S. Application Data

(62) Division of application No. 15/660,074, filed on Jul. 26, 2017, now Pat. No. 10,468,719.

(51) Int. Cl.
| | |
|---|---|
| *H01M 10/0566* | (2010.01) |
| *H01M 10/0525* | (2010.01) |
| *H01M 4/1395* | (2010.01) |
| *C01B 33/02* | (2006.01) |
| *H01M 4/04* | (2006.01) |
| *H01M 4/38* | (2006.01) |
| *H01M 4/62* | (2006.01) |
| *C01B 33/113* | (2006.01) |

(52) U.S. Cl.
CPC ......... *H01M 10/0566* (2013.01); *C01B 33/02* (2013.01); *C01B 33/113* (2013.01); *H01M 4/0469* (2013.01); *H01M 4/1395* (2013.01); *H01M 4/386* (2013.01); *H01M 4/625* (2013.01); *H01M 10/0525* (2013.01)

(58) Field of Classification Search
CPC ... H01M 4/1395; H01M 4/386; H01M 4/0469
See application file for complete search history.

(56) References Cited

U.S. PATENT DOCUMENTS

| | | |
|---|---|---|
| 9,966,631 B1 | 5/2018 | Li et al. |
| 10,468,719 B1 | 11/2019 | Li et al. |
| 2008/0026297 A1 | 1/2008 | Chen |
| 2011/0052953 A1 | 3/2011 | Saito |
| 2012/0315549 A1 | 12/2012 | Tang |
| 2013/0266875 A1 | 10/2013 | Matsumoto |
| 2014/0170484 A1 | 6/2014 | Fukahori |
| 2014/0197805 A1 | 7/2014 | Greening |
| 2014/0315104 A1 | 10/2014 | Liu |

(Continued)

FOREIGN PATENT DOCUMENTS

| | | |
|---|---|---|
| JP | 2011108550 | 6/2011 |
| WO | 2016085271 | 6/2016 |

OTHER PUBLICATIONS

U.S. Appl. No. 15/659,942, "Non-Final Office Action" dated Sep. 7, 2017, 17 pages.

(Continued)

*Primary Examiner* — Stephan J Essex
(74) *Attorney, Agent, or Firm* — Kilpatrick Townsend & Stockton LLP (57) ABSTRACT

A solid electrolyte interface is formed on a silicon monoxide electrode in a battery cell. While the solid electrolyte interface is being formed on the silicon monoxide electrode, the battery cell is charged for one or more initial cycles.

9 Claims, 11 Drawing Sheets

(56) References Cited

U.S. PATENT DOCUMENTS

| | | | |
|---|---|---|---|
| 2016/0141626 A1* | 5/2016 | Hosaka | H01M 4/134 429/217 |
| 2016/0254572 A1 | 9/2016 | Yu et al. | |
| 2017/0074634 A1 | 3/2017 | Yoon | |
| 2017/0331144 A1 | 11/2017 | Oguni et al. | |

OTHER PUBLICATIONS

U.S. Appl. No. 15/659,942, "Final Office Action" dated Nov. 16, 2017, 13 pages.
U.S. Appl. No. 15/659,942, "Notice of Allowance" dated Jan. 22, 2018, 9 pages.
U.S. Appl. No. 15/660,074, "Non-Final Office Action" dated May 17, 2018, 11 pages.
U.S. Appl. No. 15/660,074, "Final Office Action" dated Dec. 3, 2018, 11 pages.
U.S. Appl. No. 15/660,074, "Non-Final Office Action" dated Apr. 5, 2019, 11 pages.
U.S. Appl. No. 15/660,074, "Notice of Allowance" dated Jun. 27, 2019, 9 pages.
U.S. Appl. No. 15/945,955, "Non-Final Office Action" dated Oct. 16, 2019, 19 pages.
Nishijima et al., Machine translation of JP 2011-108550 A, Jun. 2011 (Year: 2011).
Author Unknown, "Lithium-silicon battery", from Wikipedia, the free encyclopedia, downloaded from "https://en.wikipedia.org/w/index.php?title=Lithium%E2%80%93silicon battery&oldid=761705614" on May 2, 2017; last modified Jan. 24, 2017.
U.S. Appl. No. 15/945,955, "Notice of Allowance", dated Apr. 9, 2020, 10 pages.
U.S. Appl. No. 15/945,955, "Final Office Action" dated Jan. 29, 2020, 20 pages.

* cited by examiner

FIG. 1

PRIOR ART

GENERATION OF WRINKLE-FREE SILICON MONOXIDE ELECTRODES USING COMBINED PREFORMATION AND FORMATION

CROSS-REFERENCE TO RELATED APPLICATIONS

This application is a divisional of U.S. Non-Provisional application Ser. No. 15/660,074, filed on Jul. 26, 2017, and titled "GENERATION OF WRINKLE-FREE SILICON MONOXIDE ELECTRODES USING COMBINED PREFORMATION AND FORMATION," which is hereby incorporated by reference in its entirety for all purposes.

BACKGROUND OF THE INVENTION

New types of battery cells with silicon-based (e.g., silicon monoxide (SiO)) electrodes are being developed because they have the potential for better energy density and/or capacity compared to graphite-based electrodes. As a result of their new composition (i.e., silicon-based instead of graphite-based), new techniques for producing battery cells with silicon-based electrodes must be developed. Naturally, it would be desirable if such new production techniques resulted in high quality battery cells, for example with desirable electrical and/or physical characteristics.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to produce a wrinkle-free silicon monoxide (SiO) electrode using a combined preformation and formation step are described herein. In some embodiments, this is done by forming a solid electrolyte interface (SEI) on a silicon monoxide electrode in a battery cell and, while the solid electrolyte interface is being formed on the silicon monoxide electrode, charging the battery cell for one or more initial cycles. As will be described in more detail below, by compressing the battery cell (and everything in it, including the forming SEI) while the SEI is being formed and the battery cell is charged for the first few times, a wrinkle-free electrode is produced.

Figure 1:
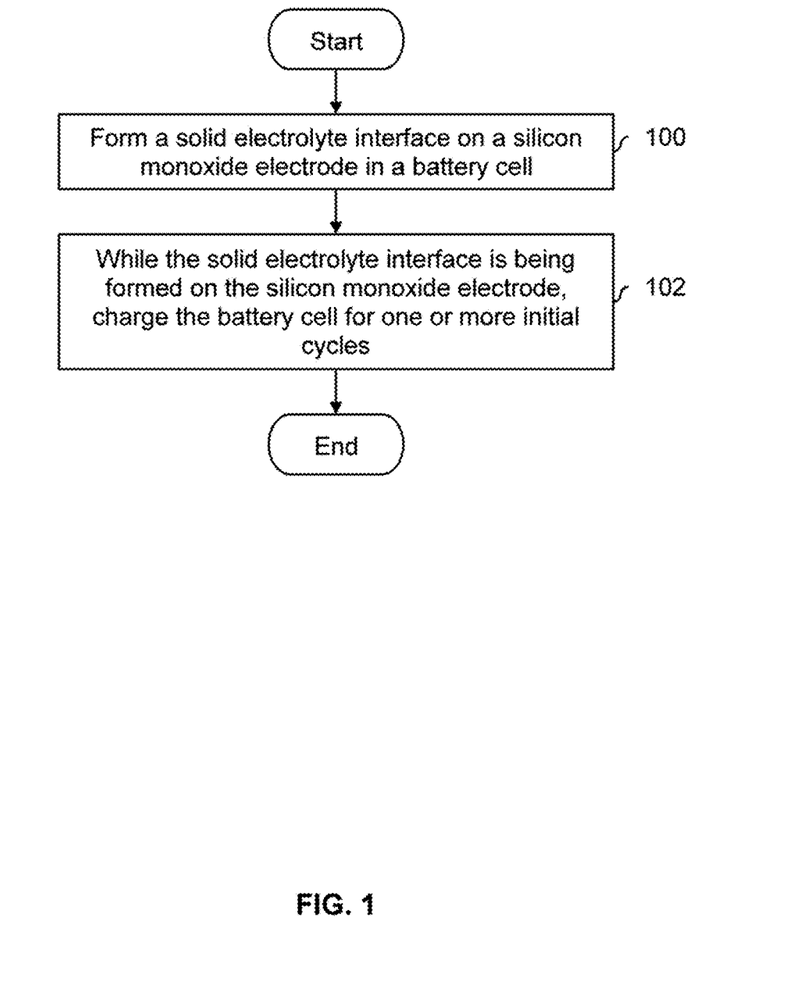
FIG. 1 is a flowchart illustrating an embodiment of a process to produce a wrinkle-free silicon monoxide electrode using a combined preformation and formation step.

FIG. 1 is a flowchart illustrating an embodiment of a process to produce a wrinkle-free silicon monoxide electrode using a combined preformation and formation step. As will be described in more detail below, this process produces a solid electrolyte interface (SEI) with good electrical and/or physical properties or characteristics, such as low resistance, good proximity between the anode and cathode, etc. The process may also be faster and/or produce better quality battery cells compared to other production processes.

At 100, a solid electrolyte interface is formed on a silicon monoxide electrode in a battery cell. An example of this is described in more detail below where the battery cell is filled with liquid electrolyte (e.g., a lithium-based liquid electrolyte, such as a combination of ethylene carbonate (EC), ethyl-methyl carbonates (EMC), and/or dimethyl carbonate (DMC), as well as lithium hexafluorophosphate ($LiPF_6$)). The solid electrolyte interface is then formed by applying a charging current to the battery cell (e.g., multiple times). This causes the liquid electrolyte in contact with the electrodes (e.g., a SiO anode and a cathode) to change from a liquid state to a solid state with the thickness of the SEI gradually increasing.

At 102, while the solid electrolyte interface is being formed on the silicon monoxide electrode, the battery cell is charged for one or more initial cycles. In other words, step 100 and step 102 occur simultaneously. Since the formation of the SEI is sometimes referred to as a preformation step and the first few times the battery cell (e.g., with the forming SEI) is electrically charged and/or exercised is sometimes referred to as a formation step, step 100 and step 102 are sometimes referred to (e.g., collectively) as a combined preformation and formation step (e.g., since they occur simultaneously).

In some embodiments, the battery cell is compressed while step 100 and step 102 are performed. By applying pressure to the battery cell while the SEI is being formed and/or the battery cell is charged for the first n times (e.g., where n≥1), all of the layers within the battery cell (e.g., the SEI, the SiO electrodes, etc.) which result or are otherwise produced will be flat and not wrinkled. As will be described in more detail below, flat layers (e.g., a flat SEI) in a battery cell are desirable.

Figure 2:
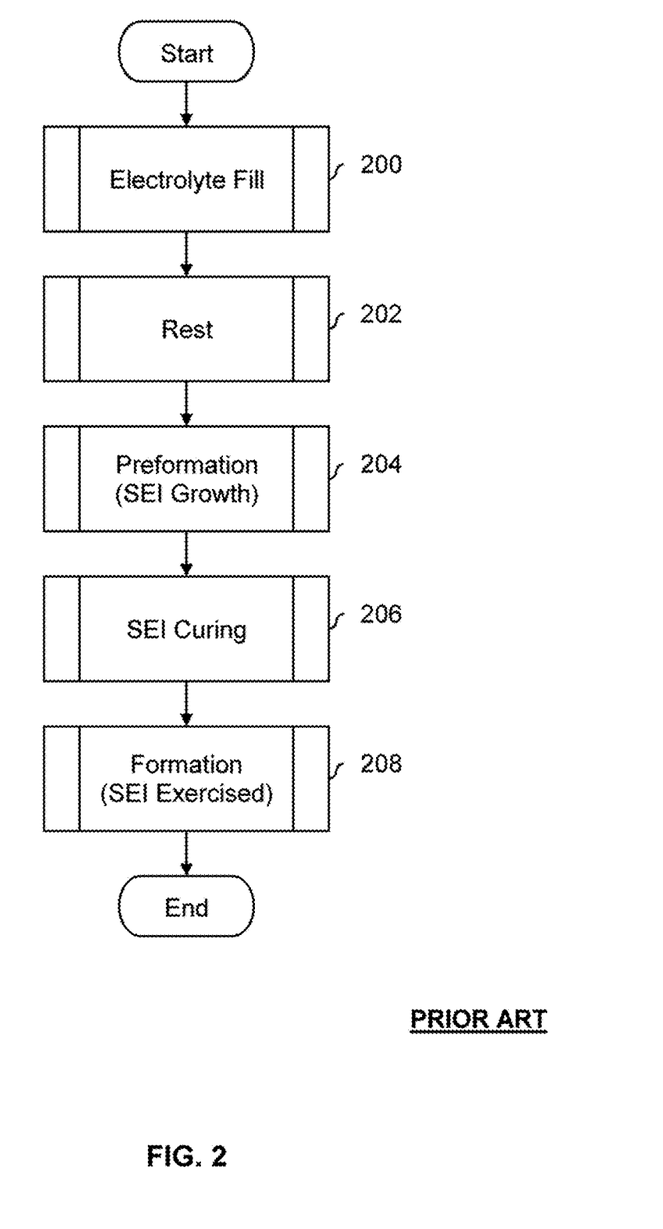
FIG. 2 is a diagram illustrating an example of battery cell production process with separate preformation and formation steps.

FIG. 2 is a diagram illustrating an example of battery cell production process with separate preformation and formation steps. In this example, the first step (200) in this example is to fill the battery cell with liquid electrolyte. The second step (202) is to rest the battery cell, for example at an elevated temperature of ~45° C. for ~12-24 hours. The third step is the preformation step (204) during which the SEI is grown. The fourth step (206) is to cure the SEI, for example by resting the battery cell in an oven at a temperature of ~45° C. for ~12-24 hours. The fifth step (208) is the formation step during which the SEI is charged (sometimes referred to as being electrically exercised) for the one or more initial cycles.

One problem with the battery cell production process shown here (e.g., where the preformation and formation steps are performed separately, such that the SEI is completely grown before the battery cell (e.g., with a fully-grown SEI) is charged and discharged for the first few times) is the length of time it takes to complete. In particular, the preformation step (204) takes a fairly long time. For example, the preformation step may include applying a charging current to the battery cell while the battery cell is uncompressed for 100 hours. Subsequently, another charging current is applied to the battery cell, this time while the battery cell is compressed, for 30 hours. 130 hours is approximately 5.4 days which means that the preformation step alone takes over 5 days (at a minimum).

In contrast, the battery cell production process described in FIG. 1 is much faster than the battery cell production process shown here. The following figure describes this in more detail using a diagram that is similar to FIG. 2.

Figure 3:
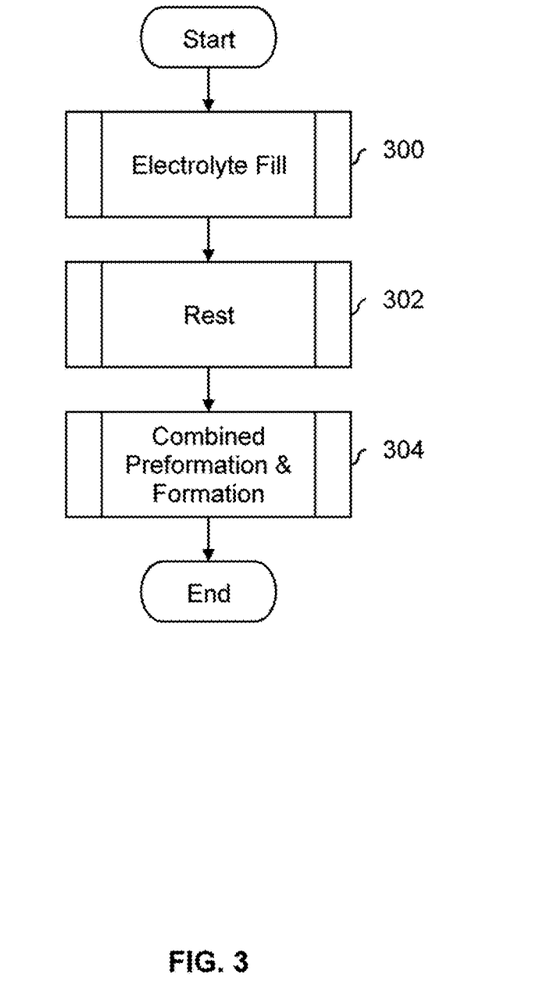
FIG. 3 is a diagram illustrating an example of battery cell production process with a combined preformation and formation step.

FIG. 3 is a diagram illustrating an example of battery cell production process with a combined preformation and formation step. In this example, the first step (300) is to fill the battery with liquid electrolyte (e.g., a lithium-based liquid electrolyte, such as a combination of ethylene carbonate (EC), ethyl-methyl carbonates (EMC), and/or dimethyl carbonate (DMC), as well as lithium hexafluorophosphate ($LiPF_6$)). For example, the battery cell is filled at a rate of ~5 mL/Ah. The battery manufacturer may want each battery cell to have some desired amount of capacity (e.g., in Ah) which in turn dictates how much volume of the liquid electrolyte to fill the battery cell with (e.g., in mL). The filled battery cell then rests for ~2 hours while sealed with a clip and is then vacuum sealed.

The second step (302) is to rest the battery cell. In one example, the battery cell rests for ~12-24 hours at an elevated temperature of ~45° C. The battery cell is then pressed at relatively high pressure (e.g., 100-200 psi) for a brief period of time (e.g., 10-20 seconds) so that the SEI is flat and not wrinkled. This brief, high pressure step in various embodiments may be performed at room temperature (e.g., 25° C.-50° C.) or at an elevated temperature (e.g., 60° C.-100° C.). No charging current is applied to the battery cell during this rest step (302).

The third step (304) is a combined preformation and formation step where the SEI is simultaneously grown while the battery cell is electrically exercised (e.g., charged and discharged) for one or more initial times or cycles. Referring back to FIG. 1, step 100 and step 102 occur in this combined preformation and formation step (304).

It may be helpful to show cross sections of the battery cell at various stages. The following figure shows an example of this.

Figure 4:
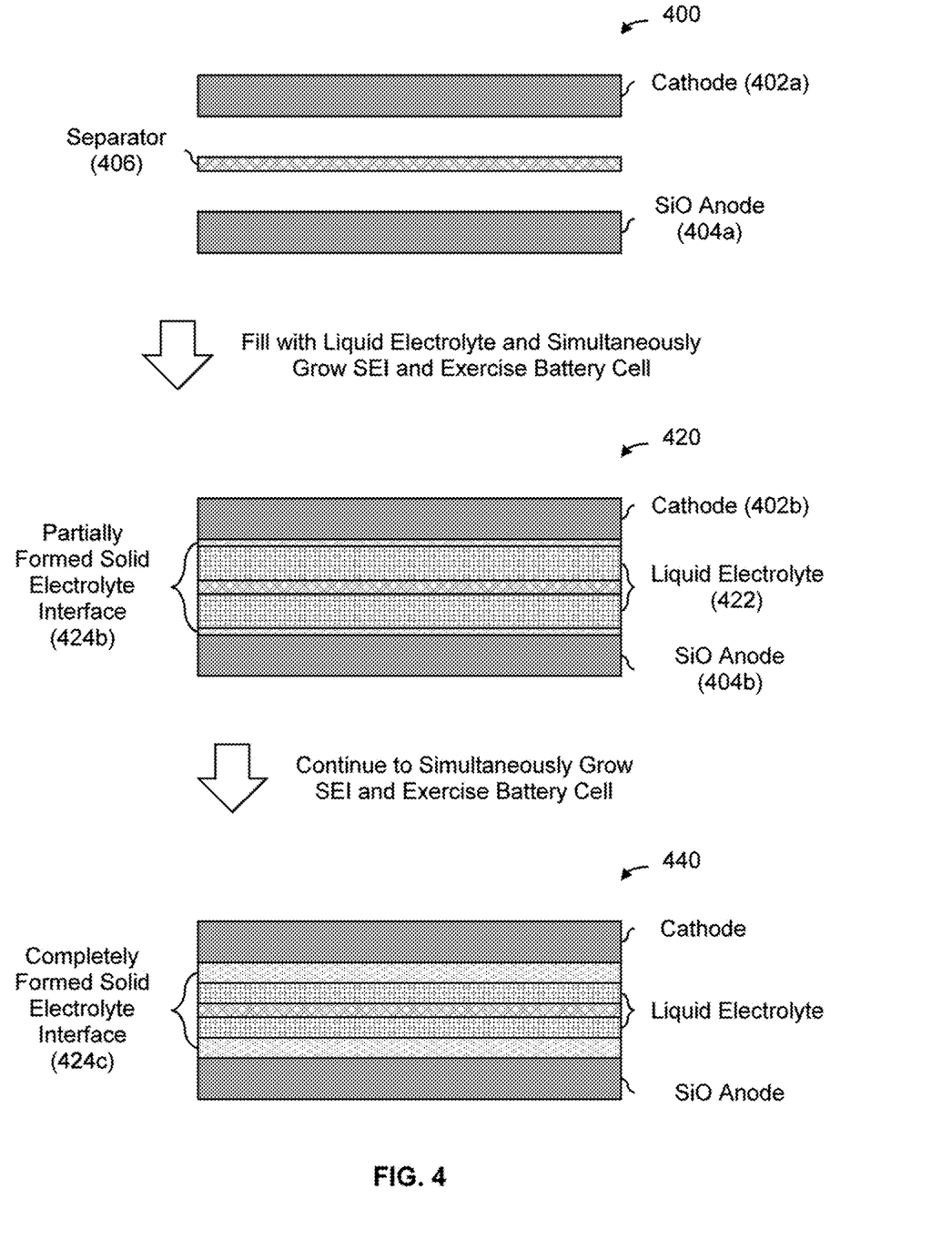
FIG. 4 is a diagram illustrating an embodiment of cross sections of a battery cell produced using a production process with a combined preformation and formation step.

FIG. 4 is a diagram illustrating an embodiment of cross sections of a battery cell produced using a production process with a combined preformation and formation step. In the example shown, diagram 400 shows the battery cell before the battery cell has been filled with liquid electrolyte and before the SEI has formed. In the state shown, there is a cathode (402a) and a SiO anode (404a), which are more generally referred to as electrodes, with a separator (406) between the two electrodes. In this example, the separator provides a physical barrier which prevents the cathode and anode from touching, which would create a short circuit. In the context of FIG. 3, diagram 400 shows the battery cell before the electrolyte fill step (300).

Diagram 420 shows the battery cell after it has been filled with a liquid electrolyte (422) and the SEI has partially formed (424b) and the battery cell (including whatever SEI has formed) has been electrically exercised. The SEI begins to form from the liquid electrolyte (422) when a charging current is applied across the battery cell (e.g., over multiple cycles of charging). The SEI grows where the liquid electrolyte comes into contact with the cathode (202b) and the SiO anode (204b). As more of the liquid electrolyte changes state from liquid to solid, the SEI continues to grow and the thickness of the SEI increases. In the state shown here, the SEI (424b) is partially formed (e.g., it has not reached its final thickness). In the context of FIG. 3, diagram 430 shows the battery cell after the combined preformation and formation step (304) has started, but before that step has completed.

Diagram 440 shows the battery cell after the SEI has completely formed. Note that the thickness of the completely formed SEI (424c) in diagram 440 is thicker than that of the partially formed SEI (424b) in diagram 420. Since the battery cell has been electrically exercised up to this point (e.g., charged and discharged for one or more initial cycles) as the SEI was growing, there is no need for a separate and/or subsequent formation step where the battery cell (including the SEI) is charged and discharged for one or more initial cycles.

An important feature of a battery cell is that it has a flat electrodes. The following figure shows an example of this.

Figure 5:
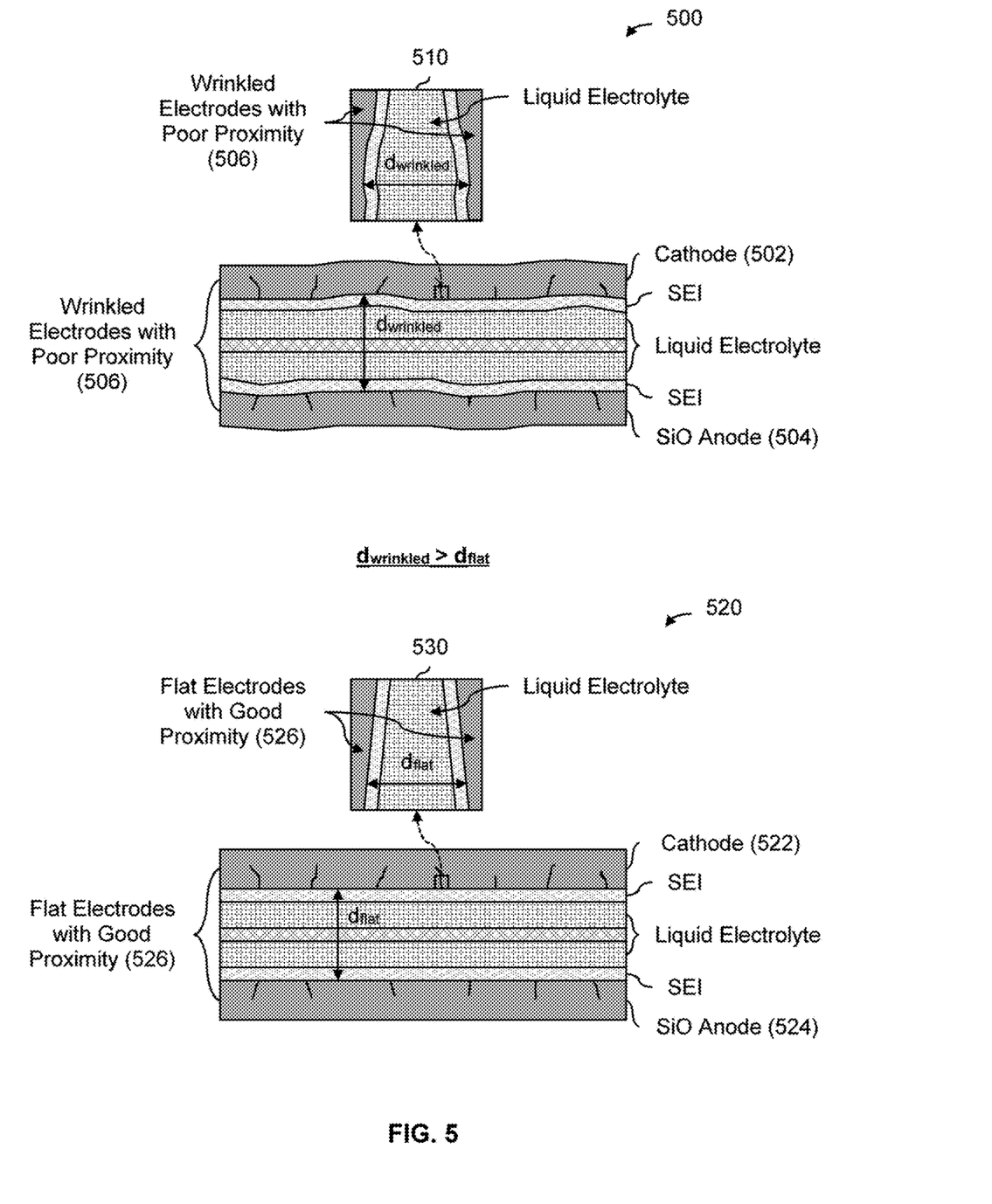
FIG. 5 is a diagram illustrating an embodiment of a cross section of a wrinkled electrode and a flat electrode.

FIG. 5 is a diagram illustrating an embodiment of a cross section of a wrinkled electrode and a flat electrode. In the example shown, diagram 500 shows a battery cell with wrinkled electrodes (506) (i.e., a wrinkled cathode (502) and a wrinkled SiO anode (504)). As shown here, the wrinkled electrodes tend to increase the distance between the two electrodes (in this example, represented by $d_{wrinkled}$), in particular where the wrinkling creates a void or concave region where one electrode (e.g., the SiO anode) pulls away from the other electrode (e.g., the cathode). This is also seen in close up view 510. This wrinkling has been particularly observed with SiO anodes. Electrically, this is undesirable because the charge produced by the battery cell flows from one electrode to the other (e.g., through the increased distance $d_{wrinkled}$) and so the battery cell cannot produce as high of a current when the anode and cathode have poor proximity because it is more difficult for the charge to cross the increased distance. This increased separation is sometimes referred to herein as poor proximity.

Diagram 520 shows an example of a battery cell with flat electrodes (526) (i.e., a flat cathode (522) and a flat SiO anode (524)). As shown here, there are no voids or concave regions in the electrode (526). This is also shown in close up view 350. The flat electrodes mean that the electrodes (i.e., the cathode (522) and SiO anode (524)) have good proximity with each other. That is, the distance between the flat electrodes (i.e., $d_{flat}$) is less than the distance between the wrinkled electrodes (i.e., $d_{wrinkled}$, where $d_{wrinkled}$>dflat). This, in turn, results in a battery cell with good electrical performance. Generally speaking, a battery cell with flat electrodes (i.e., with good proximity) is able to output a higher current than a battery cell with wrinkled electrodes (i.e., with poor proximity). For this reason, techniques which help to produce a flat electrode with good proximity are desirable.

Returning briefly to FIG. 1, the process shown there helps to produce a flat electrode (anode in this case) as opposed to a wrinkled electrode. The materials in the battery cell expand and contract but do so at different rates (e.g., some materials have large volumetric changes while others do not expand and contract as much), which results in a wrinkled electrode as different materials repeatedly expand and contract at different rates. By applying pressure to the battery cell when the battery cell is charged for the first few times (e.g., at step 102), a flatter electrode is produced.

The following figure shows an example of a system which may be used to produce a battery cell per techniques described herein.

Figure 6:
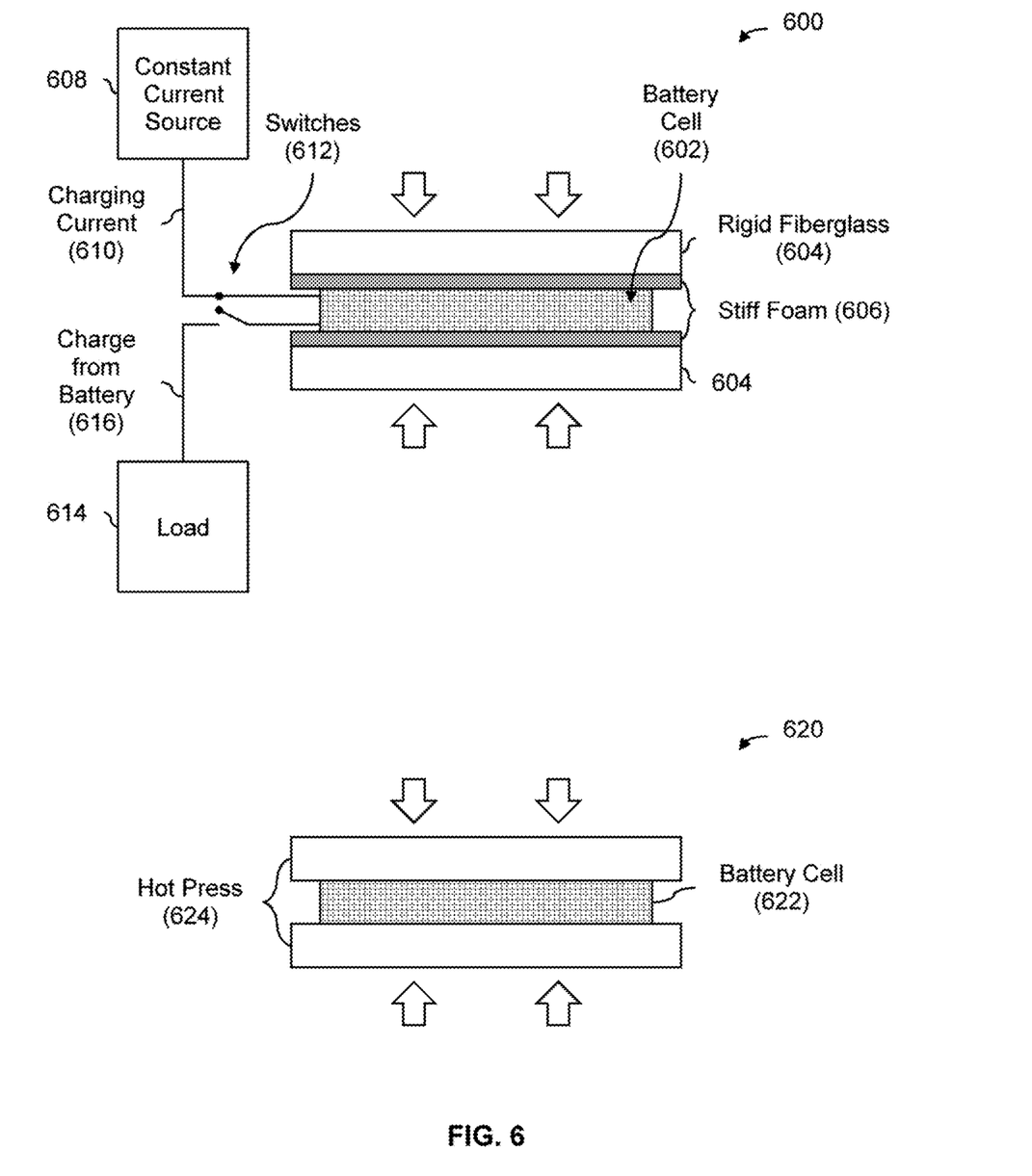
FIG. 6 is a diagram illustrating an embodiment of equipment used to produce a battery cell with a flat electrode.

FIG. 6 is a diagram illustrating an embodiment of equipment used to produce a battery cell with a flat electrode. A battery cell being produced or manufactured may be swapped out between the two pieces of equipment shown here depending upon what a given production step calls for.

Diagram 600 shows an example of a system which applies pressure and/or charge to a battery cell. In this example, a battery cell (602) is inside of a clamp which includes rigid fiberglass (604) and stiff foam (606). The stiff foam may be useful because it transfers most of the pressure from the press to the battery cell, but has some "give" to prevent damage to the battery cell. In FIG. 1, the press may be used to apply compress the battery cell at step 102.

The system shown in diagram 600 also includes a constant current source (608) which generates a constant current (610) which is used to charge the battery cell (602). This application of a constant current may be used to form an SEI (e.g., during step 100 in FIG. 1) and/or to charge the battery cell for the first time (e.g., during step 102 in FIG. 1).

To discharge the battery cell (e.g., if/when called for by some battery cell production process), the switches (612) are configured so that the connection between the constant current source (608) and battery cell (602) is disconnected and the connection between the load (614) and battery cell (602) is connected. This permits the battery cell to discharge by sending charge from the battery (616) to the load (614). For example, some production processes include multiple cycles of charging and discharging, so the switches (612) would be flipped back and forth to alternate between the constant current source (608) during charging and the load (614) during discharging.

It is noted that the application of pressure and charging/discharging may be performed independently of one another and/or in any desired combination. For example, some production processes may include a cycle where a charging current is applied while the battery cell is uncompressed. If so, the press may be opened (not shown here) so that no pressure is applied to the battery cell. Then, while the battery cell is uncompressed, a charging current is applied to the battery cell using the constant current source (608).

Diagram 620 shows an example of a hot press (624) which applies heat and/or pressure to a battery cell (622) which is inside of the hot press. Some production steps may include applying heat and/or pressure to the battery cell and the hot press may be used for those steps. In this example, the hot press is able to reach temperatures in excess of ~100° C. and pressures of ~200 psi. The heat and pressure applied are independent of each other and can be separately controlled so that any desired combination of heat and pressure (within the supported ranges) is possible.

As described above, the battery cell production process described in FIG. 1 is faster than the process described above where there are separate preformation and formation steps. The following figure describes a combined preformation and formation step in more detail, including example durations.

Figure 7:
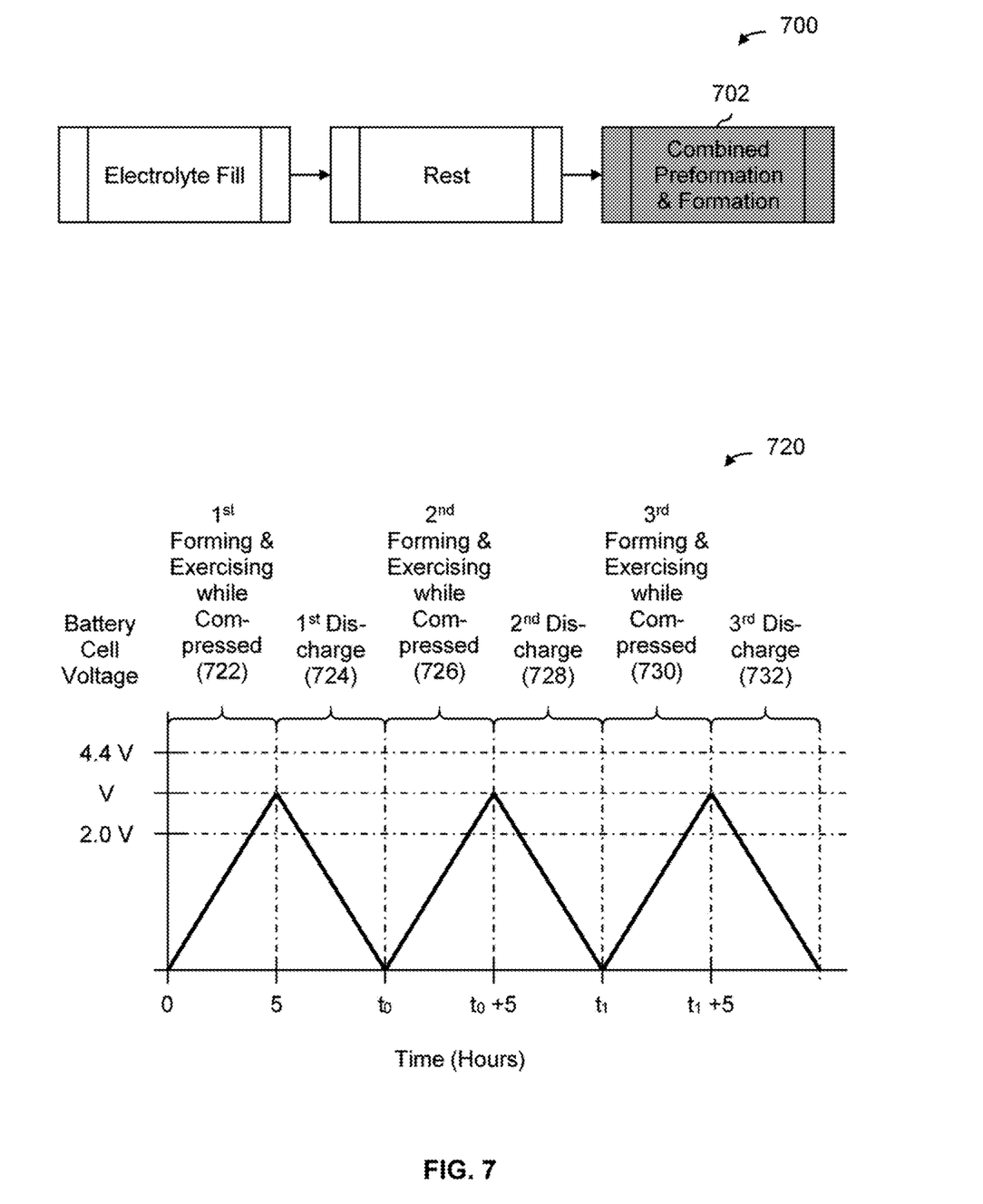
FIG. 7 is a diagram illustrating an embodiment of a combined preformation and formation step.

FIG. 7 is a diagram illustrating an embodiment of a combined preformation and formation step. For context and as a reminder, diagram 700 shows that this example is performed during a combined preformation and formation step (702).

Diagram 720 shows a graph where the x-axis is time and the y-axis is the voltage of the battery cell. During a first period of time (722) from 0 to 5 hours, the voltage is increased from 0 V to some voltage (V) which is between 2.0V and 4. V. This occurs while the battery cell is compressed (e.g., at ~50 psi, or more generally within a range of 25-75 psi) and the application of the increasing voltage causes the SEI to both form and be exercised.

During the next period of time (724), the battery cell is discharged. For example, the switches (612) in diagram 600 of FIG. 6 would be switched so that the load (614) is connected to the battery cell (602) instead of the variable voltage source (608). This enables the battery cell to discharge a current to the load and the voltage gradually decreases.

This cycle of charging the battery cell up to some voltage between 2.0V and 4.4V over a 5 hour period (or, more generally, over a period of time within 3 hours and 7 hours) and then discharging the battery cell are repeated for a second time (726 and 728) and third time (730 and 732). Each time, the SEI grows a little thicker and the battery cell (including whatever partial SEI exists at that time) is charged and discharged.

Temperature-wise, the battery cell is kept substantially at room temperature during the periods shown (722-732). Heating the battery cell to relatively high temperatures (e.g., in excess of 60° C.) for prolonged periods of time (e.g., minutes or longer) could cause unwanted and/or undesirable chemical reactions in the battery cell. For this reason, it is desirable to keep the battery cell substantially at room temperature where possible.

Pressure-wise, the battery cell is compressed during the periods shown (722-732). This helps to produce a flat electrode with no wrinkles (see, e.g., diagram 520 in FIG. 5) which has better electrical performance and/or properties than a wrinkled electrode.

Returning briefly to FIG. 2, in that example, the (e.g., separate) preformation step at 204 takes at least 130 hours to complete (and that does not include the later formation step at 208). In this example, the combined preformation and formation step (702) takes ~15 hours to complete. This shaves a few days off of the production process and is a significant time savings.

This example is described more generally and/or formally in a flowchart below.

Figure 8:
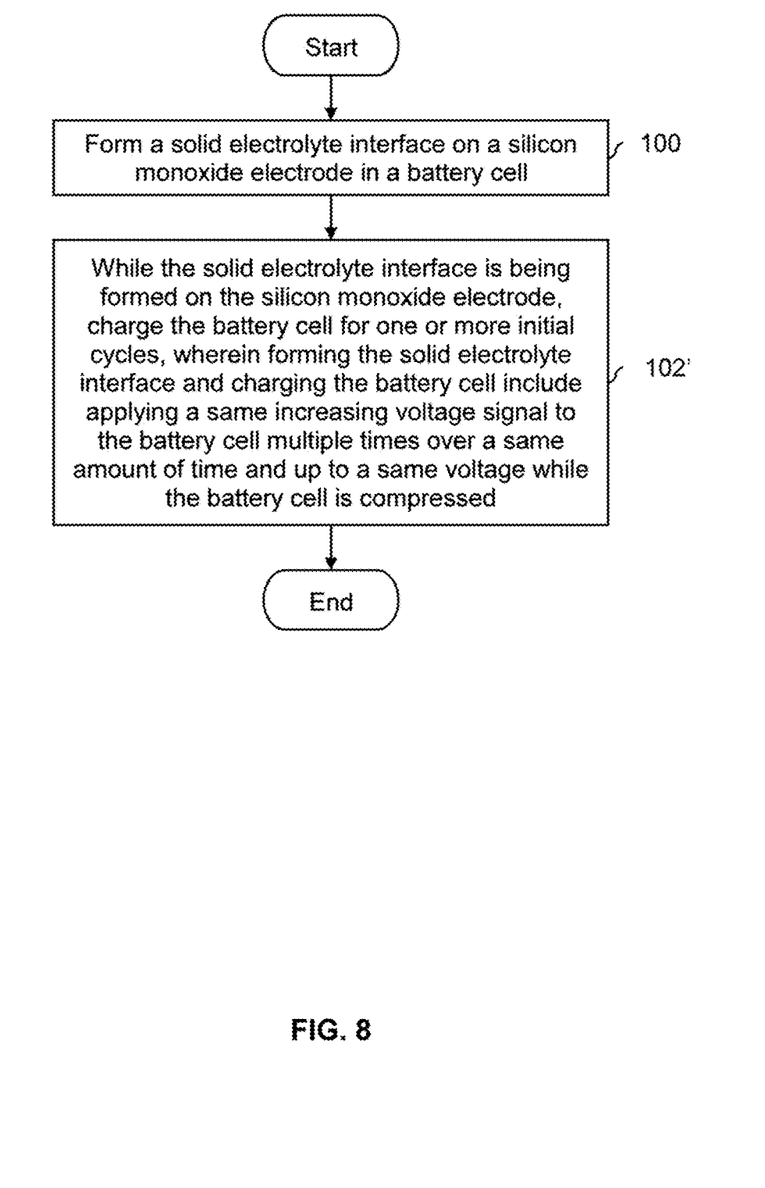
FIG. 8 is a flowchart illustrating an embodiment of a process to produce a wrinkle-free silicon monoxide electrode using a combined preformation and formation step where a same charging cycle is repeatedly used.

FIG. 8 is a flowchart illustrating an embodiment of a process to produce a wrinkle-free silicon monoxide electrode using a combined preformation and formation step where a same charging cycle is repeatedly used. FIG. 8 is similar to FIG. 1 and similar reference numbers are used to show related steps.

At 100, a solid electrolyte interface is formed on a silicon monoxide electrode in a battery cell. See, for example, FIG. 4 where the partially formed SEI (424b) is thinner than the completely formed SEI (424c). The SEI does not form instantaneously but rather grows gradually over time (e.g., over multiple cycles of charging and/or application of a charging current).

At 102', while the solid electrolyte interface is being formed on the silicon monoxide electrode, the battery cell is charged for one or more initial cycles, wherein forming the solid electrolyte interface and charging the battery cell include applying a same charging current to the battery cell multiple times over a same amount of time and up to a same voltage while the battery cell is compressed. See, for example, the three charging cycles shown in FIG. 7. The same charging pattern is repeated there three times at 722, 726, and 730: the battery cell is charged over 5 hours (i.e., over the same amount of time) and up to a voltage of V between 2.0V and 4.4V (i.e., up to same voltage). These repeated charging cycles both form the SEI and electrically exercise the battery cell (e.g., including whatever SEI exists at that time).

In additional to reducing production times, the battery cell production process described in FIG. 1 produces better quality cells. The following figure shows an example of this.

Figure 9:
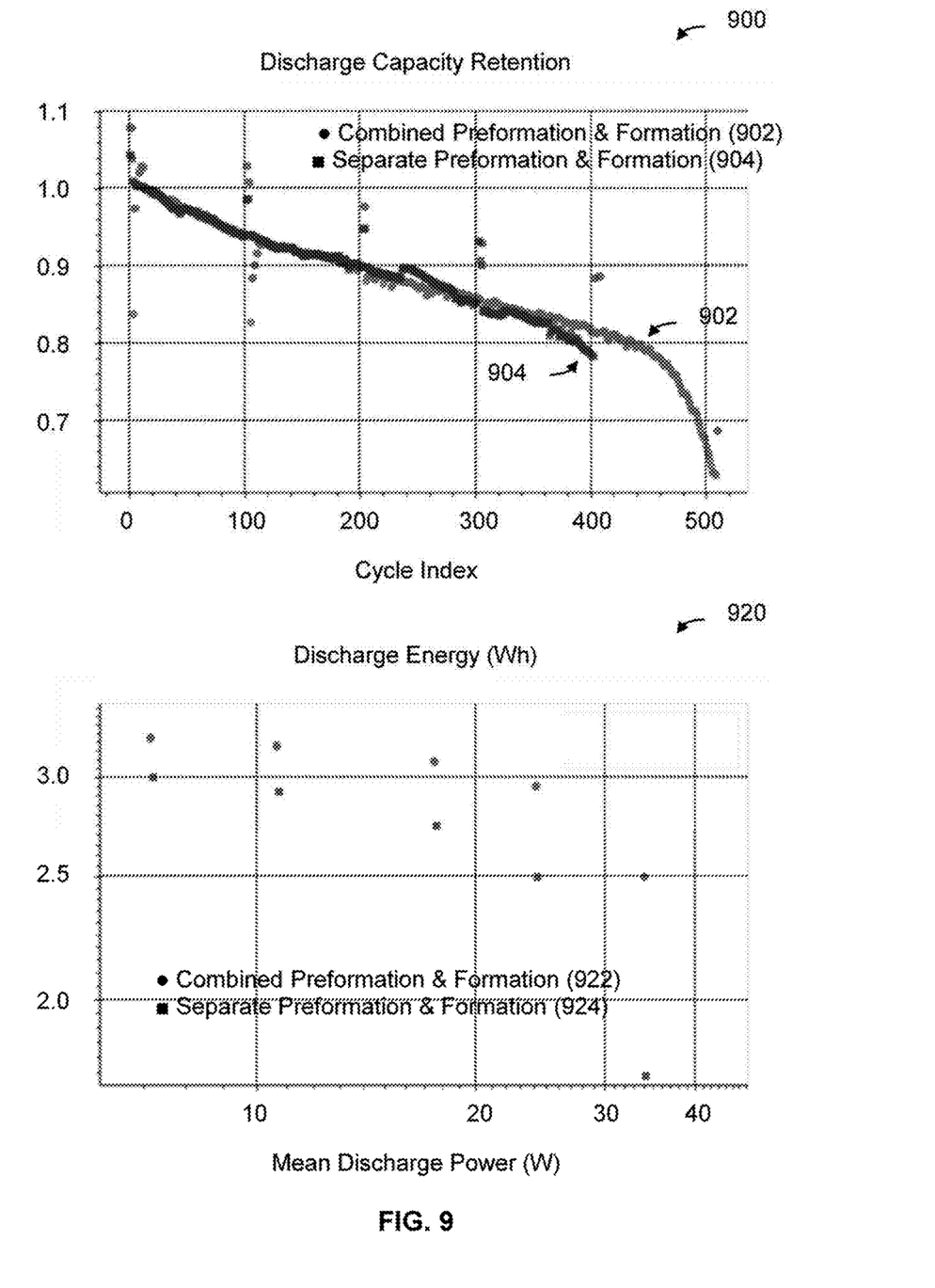
FIG. 9 is a diagram illustrating an embodiment of electrical properties of a battery cell which improve using a production process with a combined preformation and formation step.

FIG. 9 is a diagram illustrating an embodiment of electrical properties of a battery cell which improve using a production process with a combined preformation and formation step. Diagram 900 shows a graph comparing the discharge capacity retention of battery cells produced using a production process with a combined preformation and formation step (902) and separate preformation and formation steps (904) as a function of cycle index. As shown here, as the cycle index increases (i.e., as the battery cell gets older) battery cells which are produced using a combined preformation and formation step (902) have at least the same discharge capacity retention as battery cells which are produced using separate preformation and formation steps (904). In other words, the example production process with a combined preformation and formation step does not reduce the cycle life of resulting battery cells.

Diagram 920 shows a graph comparing the discharge energy (in Wh) of battery cells produced using a production process with a combined preformation and formation step (922) and separate preformation and formation steps (924) as a function of mean discharge power (in W). Across the board at various mean discharge power values, the combined step plot (922) has higher discharge energy values than the separate steps plot (924). In particular, when the mean discharge power is high, the performance difference is quite pronounced (e.g., at 34W, the difference in discharge energy is ~1.0 Wh). In other words, the example production process with a combined preformation and formation step improves the high power capability of resulting battery cells.

In summary, not only does the example production process with a combined preformation and formation step complete faster, it also produces the same or better quality battery cells with respect to discharge capacity retention (see diagram 900) and discharge energy (see diagram 920).

In some embodiments, a battery cell is briefly compressed at a relatively high pressure at various times to produce a flat electrode. The following figure shows an example of this.

Figure 10:
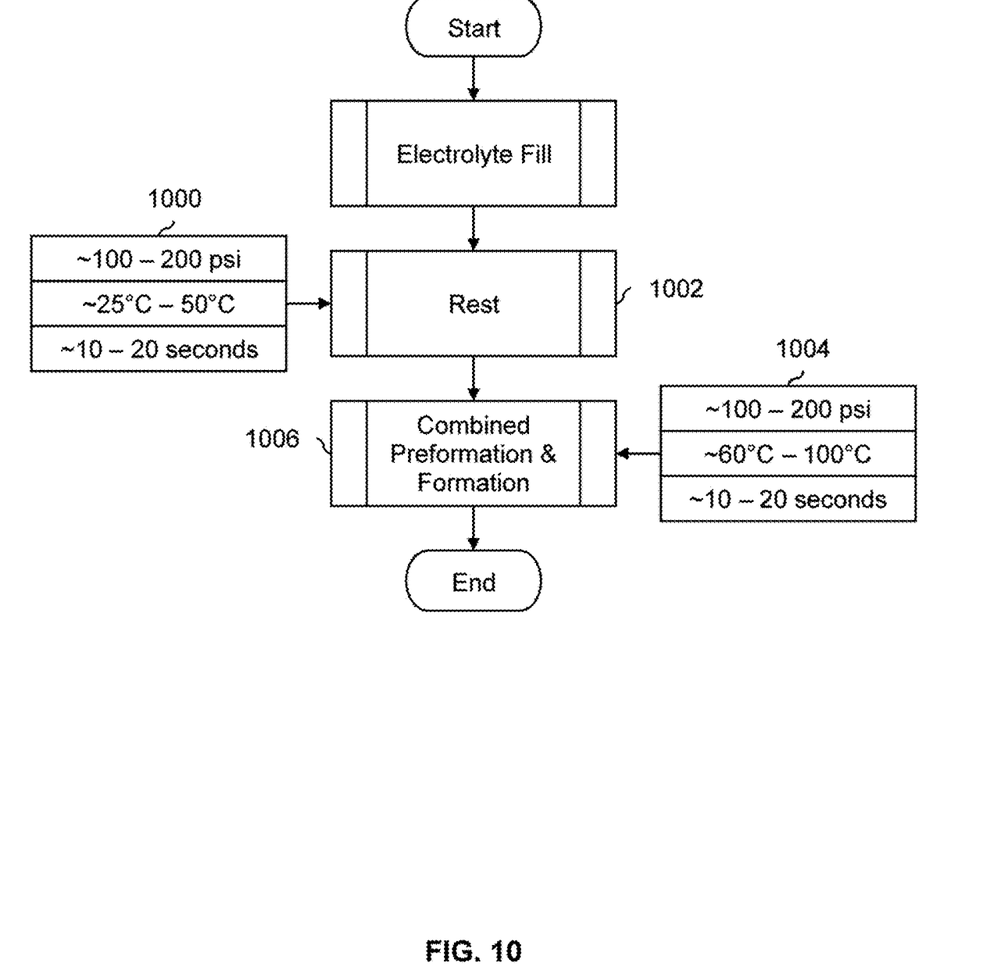
FIG. 10 is a diagram illustrating an embodiment of a high pressure step.

FIG. 10 is a diagram illustrating an embodiment of a high pressure step. In the example shown, a first high pressure step (1000) occurs during a rest step (1002). During this first high pressure step, the battery cell is compressed at ~100-200 psi, substantially at room temperature (e.g., ~25° C.-50° C.), and for a relatively short duration (e.g., ~10-20 seconds).

With regard to other steps in the rest step (1002), the high pressure step (1000) occurs after all other steps have occurred, for example, after letting the battery cell rest for 12-24 hours at elevated temperatures in an oven. To put it another way, high pressure step 1000 occurs right before the combined preformation and formation step (1006).

A second high pressure step (1004) occurs during the combined preformation and formation step (1006). During this second high pressure step, the battery cell is compressed at ~100-200 psi, at an elevated temperature (e.g., ~60° C.-100° C.), and for a relatively short duration (e.g., ~10-20 seconds). In some embodiments, this temperature range (i.e., ~60° C.-100° C.) is used because it is hot enough to soften SEI (which is in solid form) so that the electrode can be pressed flat while still minimizing any undesirable chemical reactions in the battery cell. As described above, this temperature range (e.g., ~60° C.-100° C.) may cause undesirable chemical reactions in the battery cell and therefore this step only lasts for a brief period of time.

With regard to other steps in the combined preformation and formation step (1006), the high pressure step (1004) occurs after all other steps have occurred, for example, after compressing and charging/discharging the battery cell multiple times. For example, with regard to FIG. 7, the second high pressure step (1004) shown here may occur after applying the charging current shown in FIG. 7.

Briefly compressing the battery cell throughout the production process (one example of which is shown here) may help to produce a flat SEI.

This example is described more generally and/or formally in a flowchart below.

Figure 11:
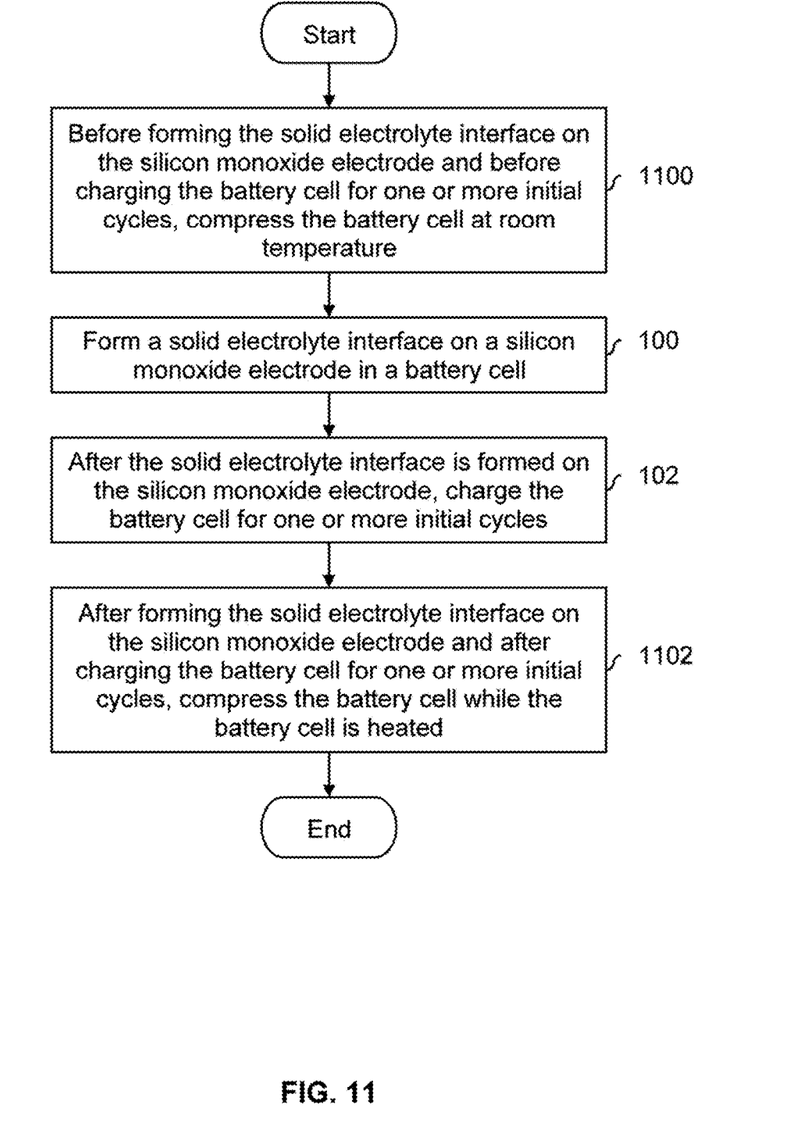
FIG. 11 is a flowchart illustrating an embodiment of a process to produce a wrinkle-free silicon monoxide electrode using a combined preformation and formation step and brief, high compression steps.

FIG. 11 is a flowchart illustrating an embodiment of a process to produce a wrinkle-free silicon monoxide electrode using a combined preformation and formation step and brief, high compression steps. FIG. 11 is similar to FIG. 1 and similar reference numbers are used to show related steps.

At 1100, before forming the solid electrolyte interface on the silicon monoxide electrode and before charging the battery cell for one or more initial cycles, the battery cell is compressed at room temperature. See, for example, the first high pressure step (1004) in FIG. 10. That high compression step (1000) is the last step in the rest step (1002). To put it another way, the high compression step (1000) is the last step before beginning the combined preformation and formation step (1006).

At 100, a solid electrolyte interface is formed on a silicon monoxide electrode in a battery cell. At 102, after the solid electrolyte interface is formed on the silicon monoxide electrode, the battery cell is charged for one or more initial cycles. For example, in FIG. 10, step 100 and step 102 would be performed during the combined preformation and formation step (1006).

At 1102, after forming the solid electrolyte interface on the silicon monoxide electrode and after charging the battery cell for one or more initial cycles, the battery cell is compressed while the battery cell is heated. See, for example, the second high pressure step (1004) in FIG. 10. In that example, the high pressure step (1004) is the last step in the combined preformation and formation step (1006) and therefore occurs after the SEI is formed and the battery cell is charged an initial number of times.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a sealed battery cell comprising:
        a silicon monoxide electrode that is wrinkle-free and flat; and
        a solid electrolyte interface that is formed on the silicon monoxide electrode in the sealed battery cell,
    a battery charging system coupled to the sealed battery cell, the battery charging system configured to:
        charge and discharge the sealed battery cell for a plurality of cycles while the solid electrolyte interface is being formed on the silicon monoxide electrode at substantially a same rate as charging and discharging the sealed battery cell after the solid electrolyte interface is fully formed,
        charge and discharge the sealed battery cell for a first cycle during which the solid electrolyte interface on the silicon monoxide electrode is at a first thickness; and
        charge and discharge the sealed battery cell for a second cycle that occurs after the first cycle during which the solid electrolyte interface on the silicon monoxide electrode is at a second thickness that is thicker than the first thickness,
    wherein the battery charging system is further configured to:
        A) charge the sealed battery cell for the plurality of cycles while the sealed battery cell is compressed, and discharge the sealed battery cell for the plurality of cycles while the sealed battery cell is uncompressed, or
        B) charge the sealed battery cell for the plurality of cycles while the sealed battery cell is uncompressed, and discharge the sealed battery cell for the plurality of cycles while the sealed battery cell is compressed.

2. The system recited in claim 1, wherein the battery charging system is further configured to charge and discharge the sealed battery cell for the plurality of cycles while the sealed battery cell is compressed to a pressure within 25 psi and 75 psi.

3. The system recited in claim 1, wherein when the solid electrolyte interface is formed, and the sealed battery cell is charged and discharged for the plurality of cycles, the battery charging system is further configured to apply a same charging current to the sealed battery cell multiple times over a same amount of time and up to a same voltage while the sealed battery cell is compressed.

4. The system recited in claim 1, wherein forming the solid electrolyte interface and charging and discharging the sealed battery cell include the battery charging system applying a same charging current to the sealed battery cell multiple times over a same amount of time within 3 hours and 7 hours and up to a same voltage while the sealed battery cell is compressed.

5. The system recited in claim 1, wherein when the solid electrolyte interface is formed, and the sealed battery cell is charged and discharged for the plurality of cycles, the battery charging system is further configured to apply a same charging current to the sealed battery cell multiple times over a same amount of time and up to a same voltage within 2.0V and 4.4V while the sealed battery cell is compressed.

6. The system recited in claim 1, wherein the sealed battery cell is compressed at room temperature before the solid electrolyte interface is formed on the silicon monoxide electrode and before the sealed battery cell is charged and discharged for the plurality of cycles; and
    wherein the sealed battery cell is compressed while the sealed battery cell is heated after the solid electrolyte interface is formed on the silicon monoxide electrode and after the sealed battery cell is charged and discharged for the plurality of cycles.

7. The system recited in claim 1, wherein the sealed battery cell further includes:
    an unsealed battery cell including the silicon monoxide electrode filled with a liquid electrolyte, wherein the unsealed battery cell filled with the liquid electrolyte is sealed in order to obtain the sealed battery cell.

8. The system recited in claim 1, wherein when the solid electrolyte interface is formed, and the sealed battery cell is charged and discharged for the plurality of cycles, the battery charging system is further configured to apply a same charging current to the sealed battery cell multiple times over a same amount of time within 3 hours and 7 hours and up to a same voltage within 2.0V and 4.4V while the sealed battery cell is compressed.

9. A system, comprising:
    a sealed battery cell comprising a wrinkle-free flat silicon monoxide electrode and a solid electrolyte interface that is formed on the wrinkle-free flat silicon monoxide electrode in the sealed battery cell, and
    a battery charging system coupled to the sealed battery cell, the battery charging system configured to:
        charge the sealed battery cell for a plurality of cycles while the sealed battery cell is compressed, and discharge the sealed battery cell for the plurality of cycles while the sealed battery cell is uncompressed, or
        charge the sealed battery cell for the plurality of cycles while the sealed battery cell is uncompressed, and discharge the sealed battery cell for the plurality of cycles while the sealed battery cell is compressed.

* * * * *